United States Patent
Tseng et al.

(10) Patent No.: US 11,506,489 B2
(45) Date of Patent: Nov. 22, 2022

(54) CONTOUR ACCURACY MEASURING SYSTEM AND CONTOUR ACCURACY MEASURING METHOD

(71) Applicant: INDUSTRIAL TECHNOLOGY RESEARCH INSTITUTE, Hsinchu (TW)

(72) Inventors: Yu-Sheng Tseng, Hsinchu (TW); Po-Hsun Wu, Hsinchu (TW); Tsung-Yu Yang, Hsinchu (TW); Chien-Yi Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 564 days.

(21) Appl. No.: 16/527,226

(22) Filed: Jul. 31, 2019

(65) Prior Publication Data
US 2020/0326185 A1    Oct. 15, 2020

(30) Foreign Application Priority Data
Apr. 15, 2019    (TW) .................................. 108113117

(51) Int. Cl.
*G01B 21/20*    (2006.01)
*G05B 19/4155*    (2006.01)
(Continued)

(52) U.S. Cl.
CPC ............ *G01B 21/20* (2013.01); *G05B 19/19* (2013.01); *G05B 19/401* (2013.01);
(Continued)

(58) Field of Classification Search
CPC ...... G01B 21/20; G05B 19/19; G05B 19/401; G05B 19/402; G05B 19/4155
See application file for complete search history.

(56) References Cited

U.S. PATENT DOCUMENTS 4,698,572 A * 10/1987 Stone ......................... B25J 9/00
                                                    318/567
4,772,831 A *  9/1988 Casler, Jr. ............ G05B 19/416
                                                    318/567
(Continued)

FOREIGN PATENT DOCUMENTS

CN    101615024    12/2009
CN    101976055     2/2011
(Continued)

OTHER PUBLICATIONS

Slamani, et al. "Modeling and experimental validation of machine tool motion errors using degree optimized polynomial including motion hysteresis", Experimental Techniques; 2011; 37-44.
(Continued)

*Primary Examiner* — Ronald D Hartman, Jr.
(74) *Attorney, Agent, or Firm* — Amin, Turocy & Watson, LLP (57) ABSTRACT

A contour accuracy measuring system and a contour accuracy measuring method are provided. The contour accuracy measuring system captures location coordinate data of shafts of a machine tool. The location coordinate data are calculated to obtain a first true round trajectory on an inclined plane as reference information. The contour accuracy measuring system then adjusts parameters of the locations of the shafts based on the location coordinate data of the shafts of the reference information to generate a second true round trajectory on the inclined plane, so as to get to know whether the locations of the shafts after the parameters are adjusted comply with a standard. Therefore, the overall measurement process can be speeded up by automatically measuring the parameters and automatically testing an operating status.

7 Claims, 10 Drawing Sheets

(51) Int. Cl.
*G05B 19/402* (2006.01)
*G05B 19/19* (2006.01)
*G05B 19/401* (2006.01)

(52) U.S. Cl.
CPC ....... *G05B 19/402* (2013.01); *G05B 19/4155* (2013.01); *G05B 2219/33099* (2013.01); *G05B 2219/37359* (2013.01)

(56) References Cited

U.S. PATENT DOCUMENTS

| | | | | |
|---|---|---|---|---|
| 4,791,575 A * | 12/1988 | Watts, Jr. | ............. | G05B 19/184 318/569 |
| 4,887,222 A * | 12/1989 | Miyake | .................. | G05B 19/41 700/262 |
| 4,967,127 A * | 10/1990 | Ishiguro | ................. | B25J 13/085 318/570 |
| 4,975,856 A * | 12/1990 | Vold | ....................... | B25J 9/1602 318/568.19 |
| 5,038,089 A * | 8/1991 | Szakaly | ............... | G05B 19/427 701/23 |
| 5,434,489 A * | 7/1995 | Cheng | ................ | G05B 19/4182 318/568.15 |
| 5,453,933 A * | 9/1995 | Wright | ................ | G05B 19/414 700/181 |
| 5,768,137 A * | 6/1998 | Polidoro | .............. | G05B 19/182 382/152 |
| 5,896,297 A * | 4/1999 | Valerino, Sr. | .... | G05B 19/41895 700/213 |
| 6,470,225 B1 | 10/2002 | Yutkowitz | | |
| 8,494,800 B2 | 7/2013 | Matsushita | | |
| 8,639,386 B2 * | 1/2014 | Summer | .............. | G05B 19/409 700/264 |
| 8,694,134 B2 * | 4/2014 | Bosscher | ............. | G05B 19/427 700/275 |
| 9,008,821 B2 | 4/2015 | Okita et al. | | |
| 2002/0068990 A1 * | 6/2002 | Yamazaki | .......... | G05B 19/4086 700/187 |
| 2014/0100688 A1 | 4/2014 | Tezuka et al. | | |

FOREIGN PATENT DOCUMENTS

| | | |
|---|---|---|
| CN | 102528553 | 7/2012 |
| CN | 105269406 | 1/2016 |
| CN | 106325207 | 1/2017 |
| EP | 1686348 | 8/2006 |
| JP | 4980453 | 7/2012 |
| TW | I235233 | 7/2005 |
| TW | 200928288 | 7/2009 |
| TW | I437207 | 5/2014 |
| TW | 201800178 | 1/2018 |

OTHER PUBLICATIONS

Beudaert, et al. "5-Axis tool path smoothing based on drive constraints", International Journal of Machine Tools and Manufacture; 2011; 51(12).

Lei, et al. "Accuracy test of five-axis CNC machine tool with 3D probe-ball. Part II:errors estimation", International Journal of Machine Tools and Manufacture; 2002; 1163-1170.

Ibaraki, et al. "Construction of an error map of rotary axes on a five-axis machining center by static R-test", International Journal of Machine Tools and Manufacture; 2011; 190-200.

Tsutsumi, et al. "Identification and compensation of systematic deviations particular to 5-axis machining centers", International Journal of Machine Tools and Manufacture;2003; 771-780.

Taiwanese Decision of Grant for Taiwanese Patent Application No. 108113117 dated Sep. 30, 2020.

* cited by examiner

CONTOUR ACCURACY MEASURING SYSTEM AND CONTOUR ACCURACY MEASURING METHOD

CROSS-REFERENCE TO RELATED APPLICATIONS

This application claims priority to Taiwanese Application Serial No. 108113117, filed on Apr. 15, 2019. The entirety of the application is hereby incorporated by reference herein and made a part of this specification.

BACKGROUND

1. Technical Field

This disclosure relates to measuring systems and methods, and, more particularly, to a contour accuracy measuring system and a contour accuracy measuring method that automatically adjust parameters of a machine tool.

2. Description of Related Art

With the rapid development of the automation of machine tools, more and more machining processes require parameter inputs for operation. Currently, machine tools mainly perform a machining process in a computer numerical control (CNC) way.

With the development of advanced manufacturing technology, there is a great demand on the stability and reliability of cutting machining. In practice, knife failure makes a great impact on the efficiency, accuracy, quality, stability and reliability of the cutting machining. Therefore, it is very important for the increase of machining accuracy and quality to select appropriate cutting parameters during a cutting machining process.

Before performing a cutting machining process, a five-axis machine tool according to the prior art will perform a standard workpiece cutting test (e.g., an idle running process). As the cutting accuracy is not as good as expected, the parameters of the controller of the five-axis machine tool corresponding to a servo motor have to be adjusted.

However, according to the prior art, a parameter adjustment process, such as the process of controlling parameters for a driving motor, is to input the parameters one by one manually, and test the operating states one by one, in order to measure the parameters that meet the standard. Thus, the overall process takes much time, consumes a lot of workpieces for testing, and does not meet the measurement cost requirement.

Therefore, how to employ a contour accuracy measuring system to reduce the measurement cost and reflect the machining accuracy of the machine tool accurately is becoming an urgent issue in the art.

SUMMARY

In view of the problems of the prior art, the present disclosure provides a contour accuracy measuring system, which is connectible to a machine tool having a controller and multiple shafts and comprises: a capturing module configured for capturing a feedback signal that the controller uses to instruct the shafts to move along a machining route, and calculating locations of the shafts in a machine coordinate system; a transforming module communicatively connected to the capturing module and configured for transforming the locations of the shafts in the machine coordinate system into locations in a workpiece coordination system and vice versa; a processing module communicatively connected to the transforming module and configured for calculating a first true round trajectory of the machining route on an inclined plane presented in the workpiece coordination system as reference information; and an adjusting module communicatively connected to the processing module and configured for adjusting, based on locations of the shafts transformed from the workpiece coordination system back to the machine coordinate system, parameters of the controller corresponding to the locations of the shafts to generate target information that includes a second true round trajectory on the inclined plane.

The present disclosure further provides a contour accuracy measuring method, which is applicable to a machine tool having a controller and multiple shafts and comprises: capturing, by a capturing module, a feedback signal that the controller uses to instruct the shafts to move along a machining route, and calculating, by the capturing module, locations of the shafts in a machine coordinate system; transforming, by a transforming module, the locations of the shafts in the machine coordinate system to locations in a workpiece coordination system in a first coordinate transforming process; calculating, by a processing module, a first true round trajectory of the machining route on an inclined plane presented in the workpiece coordination system as reference information in a calculating process; transforming, by the transforming module, the workpiece coordination system of the reference information into the machine coordinate system and restoring the locations of the shafts in the workpiece coordination system back to the locations in the machine coordinate system in a second coordinate transforming process; and based on the locations of the shafts of the reference information in the machine coordinate system, adjusting, by an adjusting module, parameters of the controller corresponding to the locations of the shafts to generate target information that includes a second true round trajectory on the inclined plane.

In the contour accuracy measuring system and the contour accuracy measuring method according to the present disclosure, coordination data captured by the capturing module of the contour accuracy measuring system are transmitted via the transforming module to the processing module to calculate the reference information, and first to fifth shafts of the machine tool are operated via the reference information in real time to get to know whether the locations of the first to fifth shafts after the parameters are adjusted meet a standard, so that the cutting accuracy of a knife of the machining tool can be measured in real time. Compared with the prior art, the contour accuracy measuring system according to the present disclosure allows a user to measure parameters and test operating states automatically and instantly know the parameters (or machining accuracy) that the knife of the machine tool needs to comply with a standard. Therefore, the overall measuring process is fast, the workpiece used for testing is not consumed, and the measurement cost is reduced.

BRIEF DESCRIPTION OF DRAWINGS

The disclosure can be more fully understood by reading the following detailed description of the embodiments, with reference made to the accompanying drawings, wherein.

DETAILED DESCRIPTION

The following illustrative embodiments are provided to illustrate the disclosure of the present disclosure, these and other advantages and effects can be apparently understood by those in the art after reading the disclosure of this specification.

It should be appreciated that the structures, proportions, size and the like of the figures in the present application are intended to be used in conjunction with the disclosure of the specification. They are not intended to limit the disclosure and therefore do not represent any substantial technical meanings. Changes or adjustments are considered to be within the scope of the present disclosure, without departing from the scope of the present disclosure. As used herein, the terminologies, such as "over," "a," and the like, are used to distinguish one element from another, and are not intended to limit the scope of the present application. Changes or adjustments are considered to be within the scope of the present disclosure, without departing from the scope of the present disclosure.

Figure 1A:
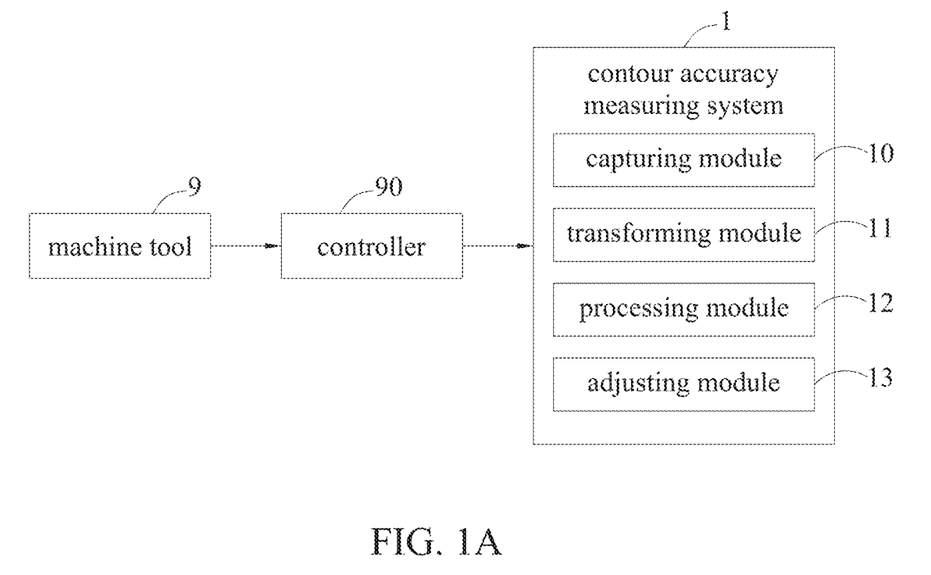
FIG. 1A is a block diagram of a contour accuracy measuring system according to the present disclosure.

FIG. 1A is a block diagram of a contour accuracy measuring system 1 according to the present disclosure. In an embodiment, the contour accuracy measuring system 1 comprises, among others, a capturing module 10, a transforming module 11, a processing module 12 and an adjusting module 13.

Figure 1B:
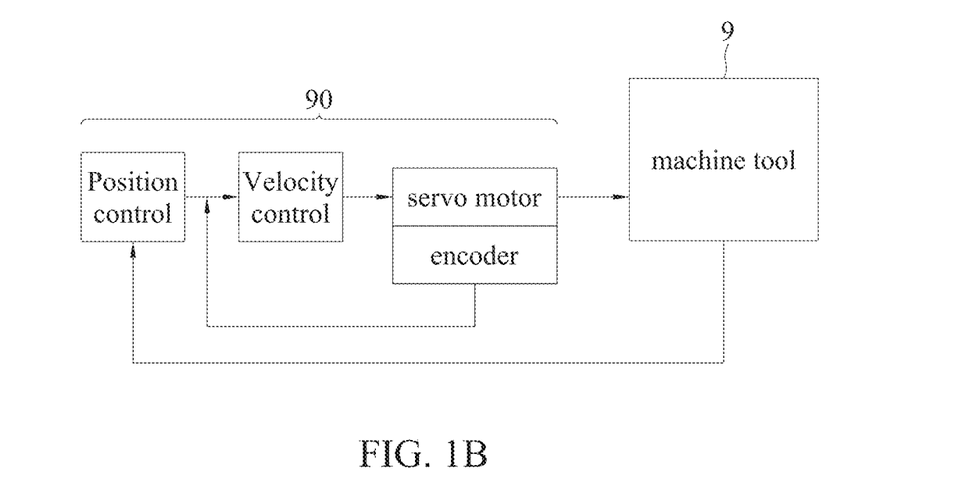
FIG. 1B is a block diagram of a machine tool, on which the contour accuracy measuring system according to the present disclosure is applied.
Figure 1C:
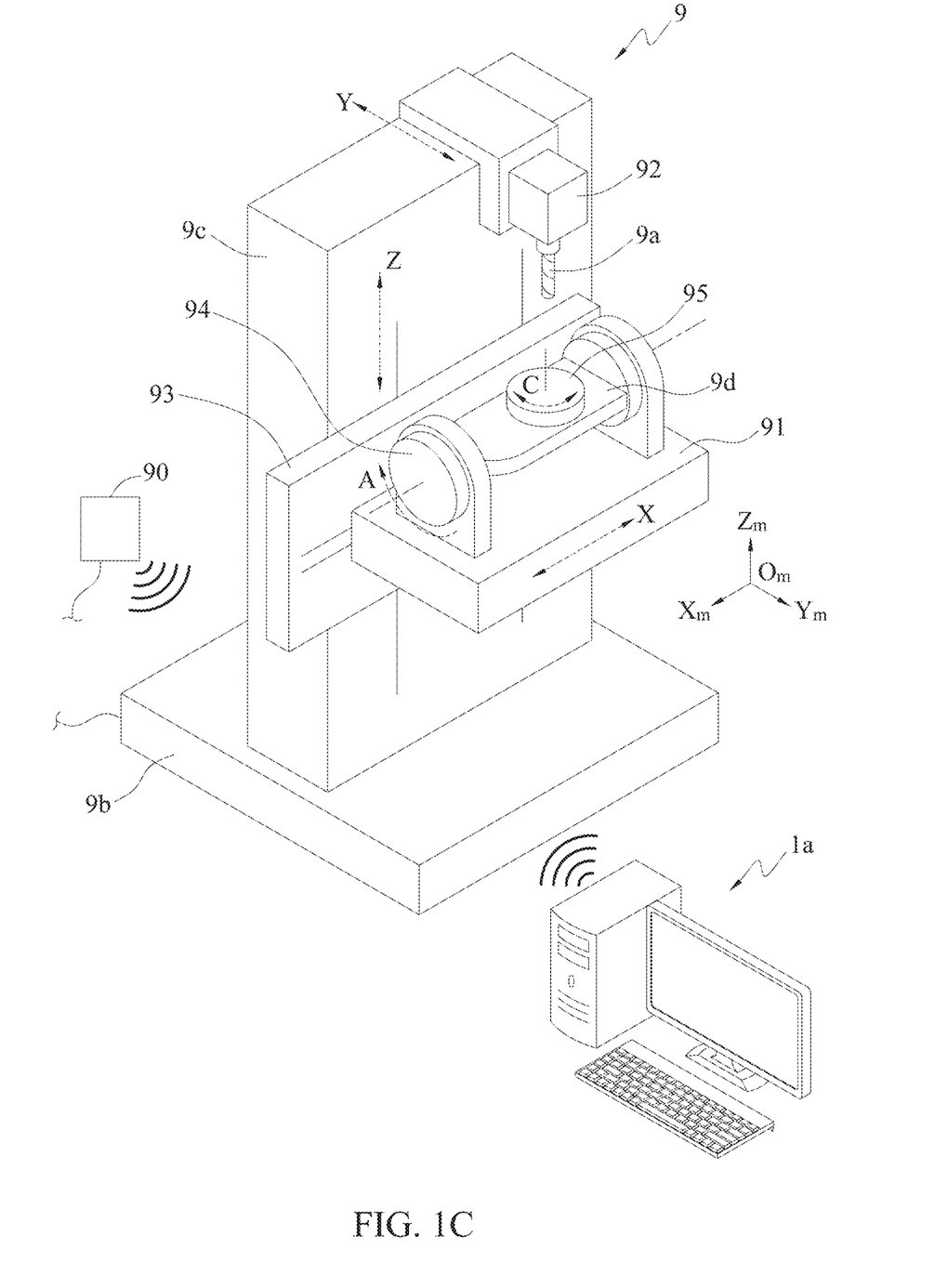
FIG. 1C is a schematic diagram of the machine tool of FIG. 1B.

Refer to FIGS. 1B and 1C. In an embodiment, the contour accuracy measuring system 1 is applied to a computer numerical control (CNC) machine tool 9 (e.g., a five-axis machine tool shown in FIG. 1C), and the machine tool 9 is provided with a controller 90 and first to fifth shafts 91 to 95 that are controlled by the controller 90. A knife 9a is mounted on the second shaft 92. The contour accuracy measuring system 1 is arranged in a standard or independent electronic device 1a (e.g., a remote computer, a personal computer, a tablet computer, a mobile phone, etc.) of, such as the machine tool 9, and can calculate and display measurement results and adjust results, and the electronic device 1a is connected to the controller 90 in a wired or wireless manner.

The five-axis machine tool 9 further comprises a base 9b, a supporter 9c and a machining platform 9d. The supporter 9c is erectly disposed on the base 9b. The knife 9a and the machining platform 9d are mounted on the supporter 9c via the shafts 91-95. The first to fifth shafts 91-95 define X-axis, Y-axis, Z-axis, A-axis and C-axis, respectively. The third shaft 93 is movably disposed on the supporter 9c, and moves along a vertical direction (e.g., Z-axis direction Z) with respect to the base 9b. The first shaft 91 is movably disposed on the third shaft 93 and provided with the machining platform 9d, and moves the machining platform 9d along one of directions (e.g., X-axis direction X) of a horizontal plane with respect to the base 9b. The second shaft 92 is movably disposed on the supporter 9c and provided with the knife 9a, and moves the knife 9a along the other one of the directions (e.g., Y-axis direction Y) of the horizontal plane with respect to the base 9b. The fourth shaft 94 is disposed on the first shaft 91 and axially connected to the machining platform 9d, and rotates the machining platform 9d about an axis center of the fourth shaft 94 (e.g., a rotation direction A). The fifth shaft 95 is a rotation plate that self-spins about an axis center of the fifth shaft 95 with respect to the machining platform 9d (e.g., a rotation direction C), and is mounted on the machining platform 9d for carrying a workpiece (not shown). Therefore, the location of the knife 9a with respect to the workpiece (i.e., the fifth shaft 95) can be inferred from the movement of the first to fifth shafts 91-95.

The capturing module 10 is configured for capturing a feedback signal of the controller 90 corresponding to a machining route of the first to fifth shafts 91-95 (or the knife 9a), and calculating locations of the first to fifth shafts 91-95 in a machine coordinate system.

In an embodiment, the machine coordinate system is defined with the base 9b as a reference plane, such as a coordinate definition with an origin Om (Xm, Ym, Zm) shown in FIG. 1C.

The transforming module 11 is communicatively connected to the capturing module 10 (in a wired or wireless manner), and transforms locations of the first to fifth shafts 91-95 in the machine coordinate system into locations in the workpiece coordination system and vice versa.

In an embodiment, the workpiece coordination system is defined to divide the machine tool 9 into a plurality of coordinate systems to describe the relative displacement and gesture between the shafts of the machine tool. In an embodiment, the workpiece acts as an initial coordinate which defines the locations of the workpiece and the fifth shaft 95, a fifth sub-coordinate is a relative location relation of the fifth shaft 95 (the rotation plate) and the machining platform 9d, a fourth sub-coordinate is a relative location relation of the fourth shaft 94 and the machining platform 9d, a third sub-coordinate is a relative location relation of the third shaft 93 and the first shaft 91, a second sub-coordinate is a relative location relation of the second shaft 92 and the supporter 9c, a first sub-coordinate is a location relation of the first shaft 91 and the fourth shaft 94, a vertical coordinate is a relative location relation of the supporter 9c and the third shaft 93, a base coordinate is relative location relation of the base 9b and the supporter 9c, a knife coordinate is a relative location relation of the knife 9a and the second shaft 92, etc.

The processing module 12 is communicatively connected to (in a wired or wireless manner) the transforming module 11, and calculates a first true round trajectory of the machining route on an inclined plane presented in the workpiece coordination system as reference information.

In an embodiment, the processing module 12 calculates the first true round trajectory on the inclined plane according to an equation of a circle from three points.

The reference information is a measurement result that comprises an estimated roundness of the first true round trajectory, which is displayed on a display of the electronic device 1a.

The adjusting module 13 is communicatively connected to (in a wired or wireless manner) the processing module 12, transforms the locations in the workpiece coordination system back into the locations in the machine coordinate system based on the first to fifth shafts 91-95 of the reference information, and adjusts the parameters of the controller 90 corresponding to the locations of the first to fifth shafts 91-95 to generate the target information, which comprises a second true round trajectory on the inclined plane.

In an embodiment, the first true round trajectory and the second true round trajectory have different contours. In another embodiment, the first true round trajectory and the second true round trajectory have different roundness.

The target information is an adjusting result that comprises an estimated roundness of the second true round trajectory, which is displayed on the display of the electronic device 1a.

Figure 2:
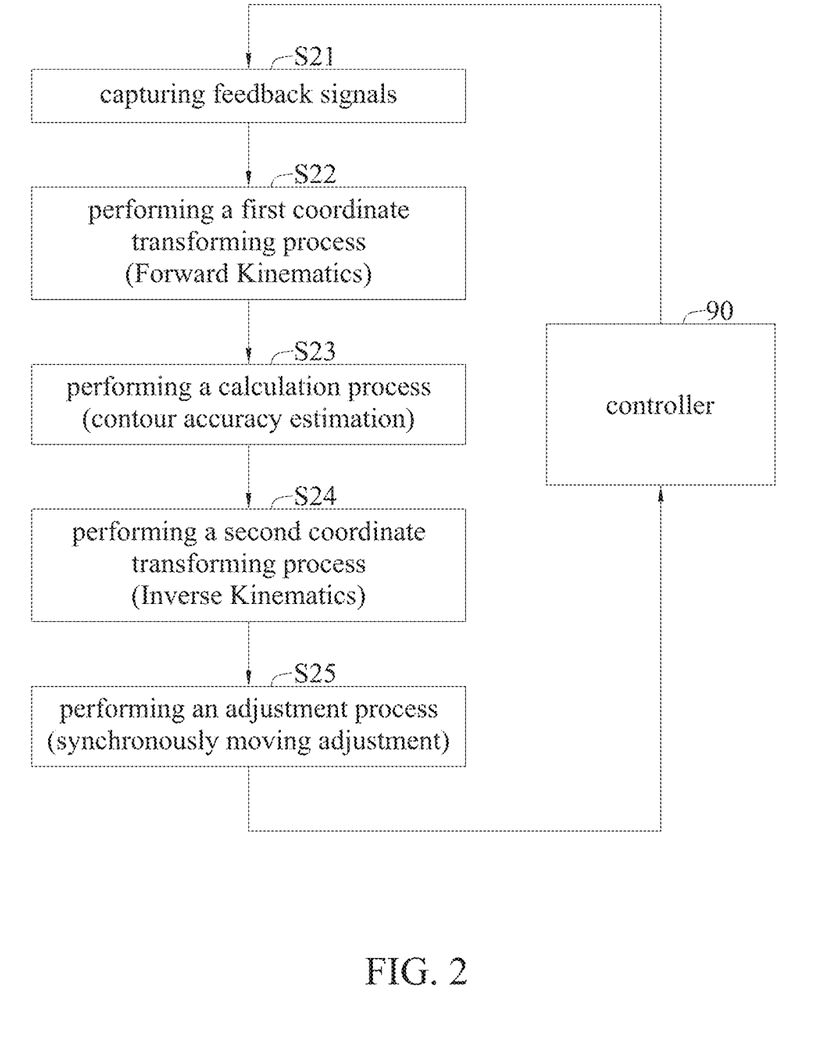
FIG. 2 is a flow chart of a contour accuracy measuring method according to the present disclosure.

FIG. 2 is a flow chart of a contour accuracy measuring method according to the present disclosure. The contour accuracy measuring method employs the contour accuracy measuring system 1 to operate.

In step S21, a user actuates the machine tool 9 and the contour accuracy measuring system 1 (or the electronic device 1a), and inputs parameters to the controller 90 to enable a servo motor to actuate the first to fifth shafts 91-95 to enable the knife 9a to run idle before a machining process is performed (i.e., no workpiece being on the fifth shaft 95); the capturing module 10 of the contour accuracy measuring system 1 (or the electronic device 1a) captures via a communication transmission mechanism (e.g., a network) a feedback signal of the controller 90 (or the servo motor) corresponding to a machining route of the knife 9a (or the movements of first to fifth shafts 91-95); and the capturing module 10 calculates locations of the first to fifth shafts 91-95 in the machine coordinate system (e.g., first coordinate data of a moving route).

In an embodiment, the capturing module 10 captures data by direct internal transmission (e.g., the machine tool 9 being arranged with the contour accuracy measuring system 1 or the electronic device 1a), an application program interface (e.g., for obtaining internal information of a digital controller of the machine tool 9), a programmable controller (e.g., a programmable logic controller (PLC)) for transmitting and storing internal and external signals of the controller 90, or direct transmission of an external device (e.g., an encoder that transmits coordinate signals, an optical scale that transmits coordinate signals, or a data capturing card that transmits coordinates, NC code column numbers or G code types).

In the operation of the machine tool 9, the contour accuracy measuring system 1 can obtain and record coordinate data of a moving route of the knife 9a of the machine tool 9 from various sources, such as a position controller and a speed controller of the controller 90 of the machine tool 9, an encoder on a servo motor of the machine tool 9, or an optical scale on the machining platform 9d.

In step S22, a first coordinate transforming process is performed, in which the transforming module 11 of the electronic device 1 transforms the locations of the first to fifth shafts 91-95 in the machine coordinate system into the locations in workpiece coordination system.

In an embodiment, the transforming module 11 transforms, based on Forward Kinematics, the actual locations of the first to fifth shafts 91-95 from the locations in the machine coordinate system to the locations in the workpiece coordination system (e.g. second coordinate data of a moving route).

Figure 3A:
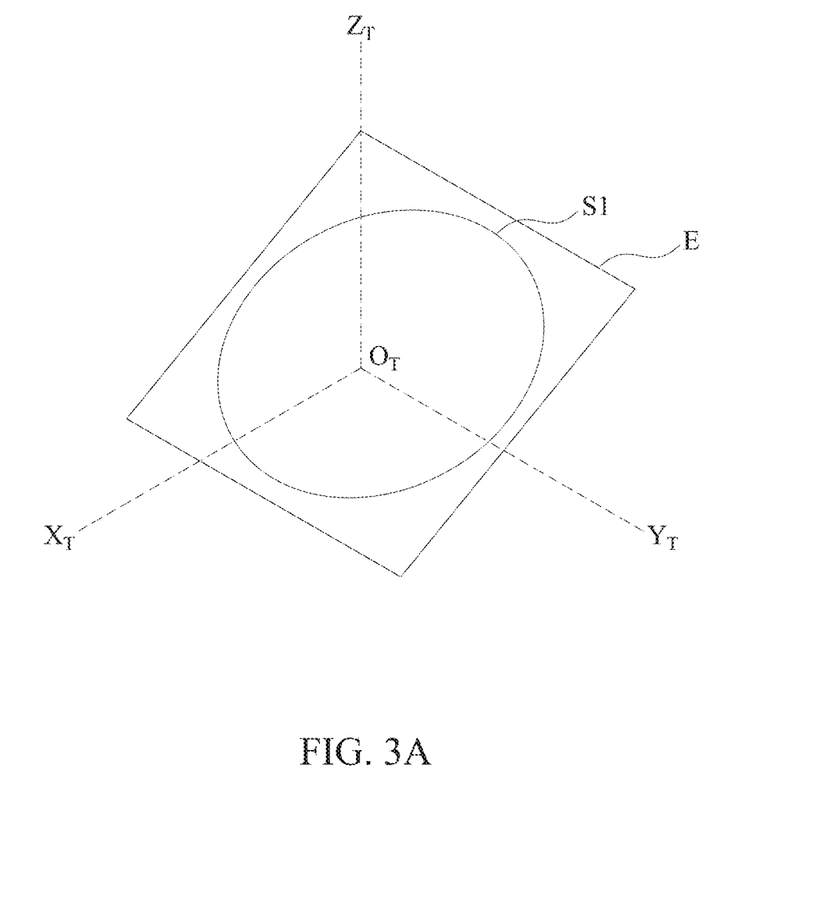
FIG. 3A shows contents of reference data of a contour accuracy measuring method according to the present disclosure.

In step S23, the electronic device 1a employs the processing module 12 to perform a calculation process to calculate a first true round trajectory S1 of the machining route of the knife 9a (or movements of the first to fifth shafts 91-95) on an inclined plane E presented in the workpiece coordination system, such as a knife coordinate ($O_T$, $X_T$, $Y_T$, $Z_T$) shown in FIG. 3A, as reference information. An estimated roundness (e.g., 22 um) of the first true round trajectory S1 is displayed on a display of the electronic device 1a.

Figure 3B:
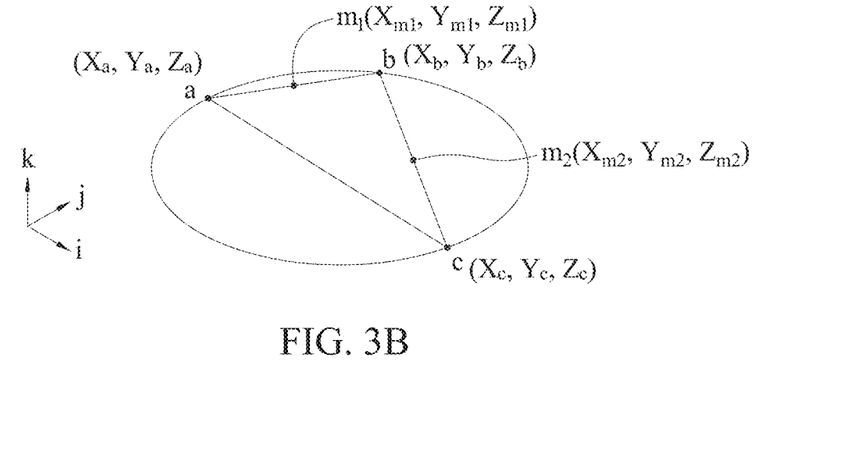
FIGS. 3B to 3D show calculation of the reference data of FIG. 3A.
Figure 3C:
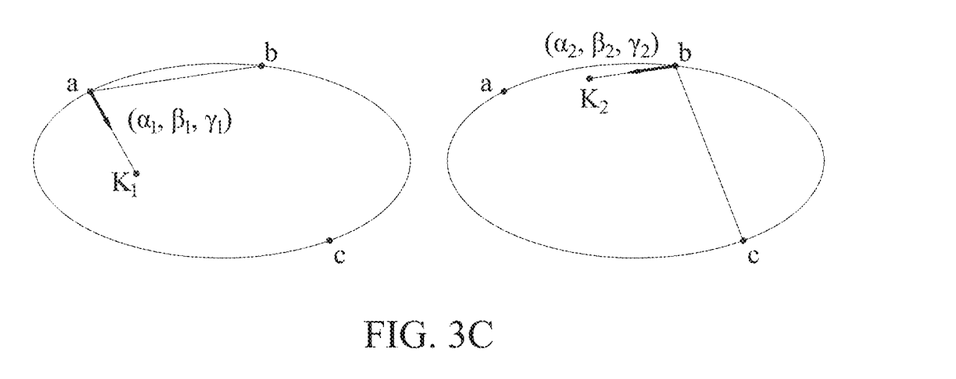
Figure 3D:
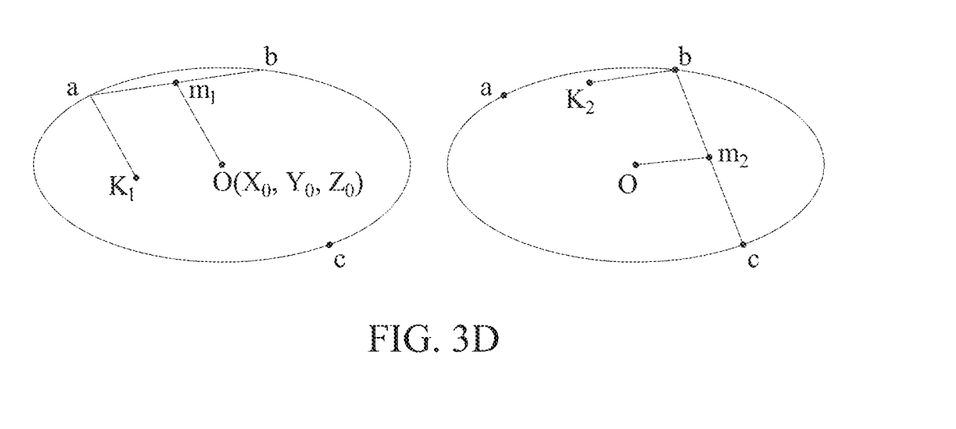

In an embodiment, the calculation process is a contour accuracy estimating process, in which an average central point is obtained from the information of the transformed workpiece coordination system (e.g., the second coordinate data of a moving route) according to an equation of a circle from three points, and a difference between a maximal radius and a minimum radius is calculated based on the central point. As shown in FIGS. 3B to 3D, three coordinate points a ($X_a$, $Y_a$, $Z_a$), b ($X_b$, $Y_b$, $Z_b$) and c ($X_c$, $Y_c$, $Z_c$) are selected first, to obtain a first line segment ab and a second line segment bc, and then a center O is obtained by intersecting a perpendicular bisector of the first line segment ab with a perpendicular bisector of the second line segment bc. The coordinate of the center O ($X_O$, $Y_O$, $Z_O$) is as follows:

$$X_O = X_{m1} + K_1\alpha_1 = X_{m2} + K_2\alpha_2;$$

$$Y_O = Y_{m1} + K_1\beta_1 = Y_{m2} + K_2\beta_2; \text{ and}$$

$$Z_O = Z_{m1} + K_1\gamma_1 = Z_{m2} + K_2\gamma_2,$$

where ($X_{m1}$, $Y_{m1}$, $Z_{m1}$) represents the coordinate of a middle point $m_1$ of the first line segment ab, ($X_{m2}$, $Y_{m2}$, $Z_{m2}$) represents the coordinate of a middle point $m_2$ of second line segment bc, and $\alpha_1$, $\beta_1$, $\gamma_1$, $\alpha_2$, $\beta_2$ and $\gamma_2$ are unit vectors of the perpendicular bisectors.

The coordinates of the middle points $m_1$ and $m_2$ are calculated as follows:

$$m_1 = \tfrac{1}{2}(X_a + X_b, Y_a + Y_b, Z_a + Z_b); \text{ and}$$

$$m_2 = \tfrac{1}{2}(X_b + X_c, Y_b + Y_c, Z_b + Z_c).$$

The maximal radius $R_1$ and the minimum radius $R_2$ can be inferred as follows:

$$R_1 = [X_{m1}(i) + Y_{m1}(j) + Z_{m1}(k)] + K_1[\alpha_1(i) + \beta_1(j) + \gamma_1(k)];$$
and $$R_2 = [X_{m2}(i) + Y_{m2}(j) + Z_{m2}(k)] + K_2[\alpha_2(i) + \beta_2(j) + \gamma_2(k)],$$

where i, j and k represent three dimensions of a vector.

The central points $K_1$ and $K_2$ are calculated as follows:

$$K_1 = [\beta_2(X_{m2} - X_{m1}) \pm \alpha_2(Y_{m1} - Y_{m2})]/(\alpha_1\beta_2 - \alpha_2\beta_1); \text{ and}$$

$$K_2 = (X_{m1} + K_1\alpha_1 - X_{m2})/\alpha_2.$$

In step S24, a second coordinate transforming process is performed, in which the transforming module 11 of the electronic device 1a transforms the workpiece coordination system of the reference information into the machine coordinate system, via, for example, Inverse Kinematics, allowing the locations of the first to fifth shafts 91-95 in the workpiece coordination system to be restored to the locations in the machine coordinate system (e.g., third coordinate data of a moving route).

Figure 4:
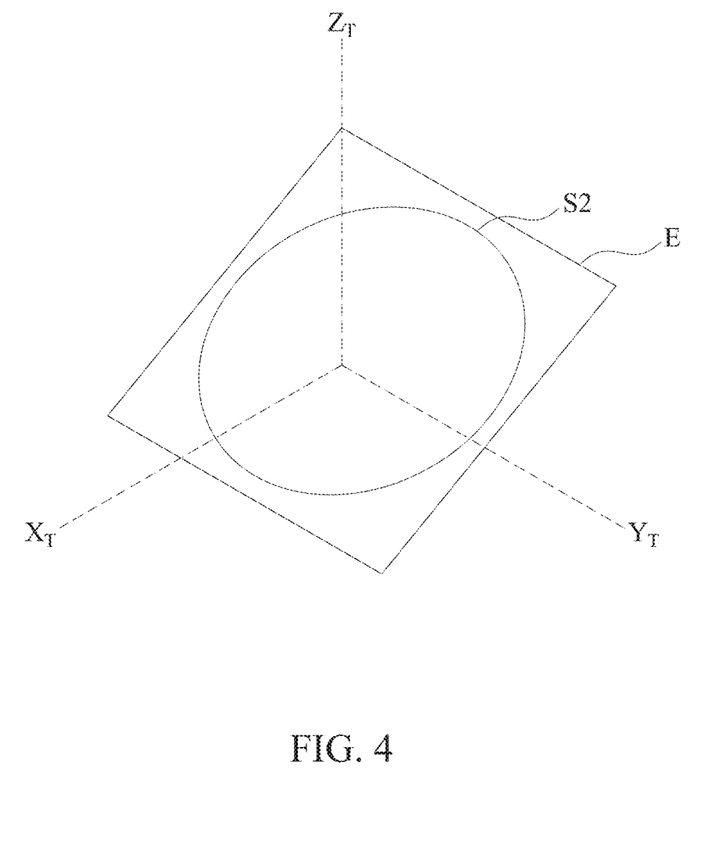
FIG. 4 shows contents of target data of a contour accuracy measuring method according to the present disclosure.

In step S25, the adjusting module 13 of the electronic device 1a synchronously adjusts the parameters of the controller 90 corresponding to the locations of the first to fifth shafts 91-95 according to the locations of the first to fifth shafts 91-95 of the reference information in the machine coordinate system to generate target information (e.g., fourth coordinate data of a moving route). In an embodiment, the target information comprises the second true round trajectory S2 on the inclined plane E, which can be displayed on the electronic device 1a, as shown in FIG. 4.

In an embodiment, since the controller 90 synchronously adjusts the locations of the first to fifth shafts 91-95, allowing the capturing module 10 of the electronic device 1a (the contour accuracy measuring system 1) to capture signals of the controller 90 that are used to adjust the servo motor of the first to fifth shafts 91-95 again and calculate an estimated roundness (e.g., 8.1 um shown in FIG. 4) via steps S21-S24, the adjusting module 13 can keep on calculating a true round trajectory state presented based on the adjusted parameters to generate dynamic effect parameters in real time as the target information. Therefore, the electronic device 1a can get to know the relation between the adjusted parameters and the error of the roundness. In an embodiment, the data quantification data table of the dynamic effect parameters comprises an integration time constant Ti, a location gain Kpp, a speed gain Kvp, and a correspondence table of a stable state effect to a contour error (roundness), such as the architecture of the controller 90 shown in FIG. 5, the correspondence relation of the location gain Kpp shown in FIG. 6, and the correspondence relation of the speed and the integration time constant Ti as shown in FIGS. 7A and 7B.

Figure 5:
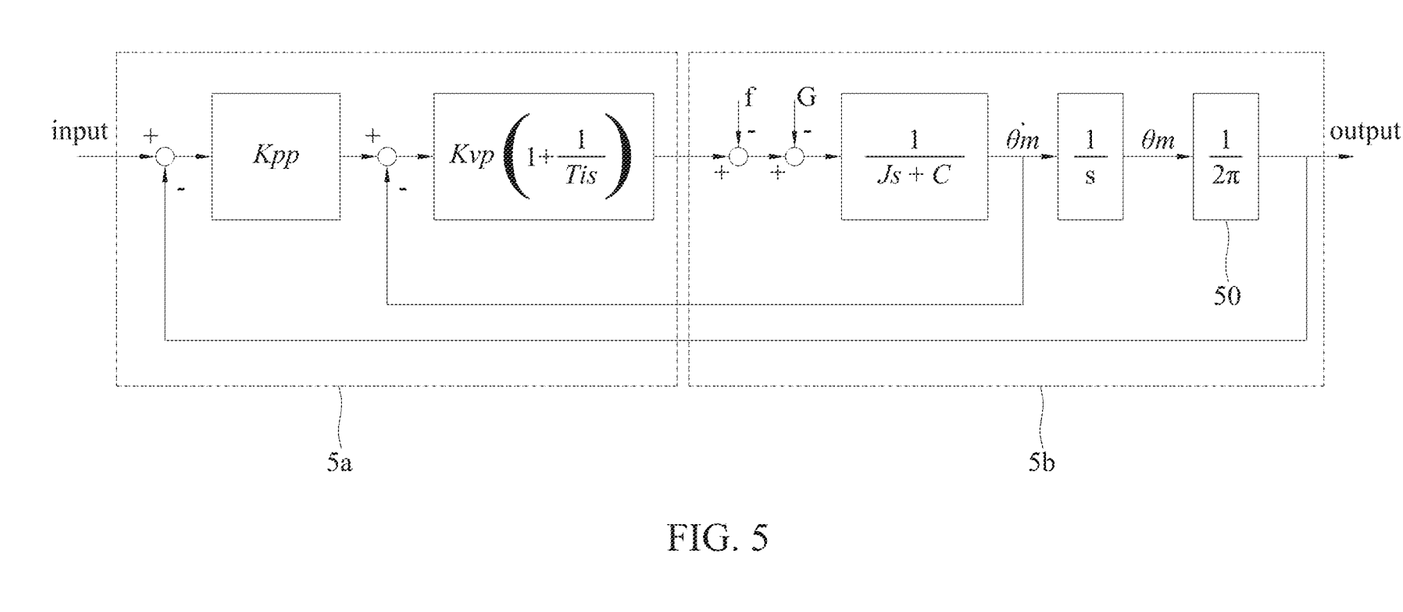
FIG. 5 is a block diagram of a controller of a machine tool, on which a contour accuracy measuring system according to the present disclosure is applied.

As shown in FIG. 5, a control system of the controller 90 acts as a location close-loop architecture, and comprises, in addition to a driver and a motor (such as the AC servo motor 5a shown in FIG. 5), an overall model 5b of the whole machine tool 9 (e.g., a coupling, a lead screw 50 and a moving platform) and a connection mechanism of the shafts corresponding to workpieces. During the control process, the modes of the whole machine tool 9 are considered, such as a total inertia moment of force (J) and a viscous damping ratio (C). The location gain $K_{pp}$ is a ratio gain value that changes a location command to a speed command. In a speed loop, the speed gain $K_{vp}$ is a ratio gain value of a speed torque, $T_i$ is an integration time constant of a compensated error value, f is a friction force needed to be overcome when the motor in operation is interfered externally, G is the gravity that the machine tool has to overcome, J is a total inertia moment of force of a motor to a mechanism (e.g., the first to fifth shafts 91-95), C is a viscous damping ratio, l is the lead of a ball screw, and s is a constant.

For a control loop, the most important condition is the accuracy of the machine. Therefore, the control loop is designed to be a location close-loop control. For a driver and a control motor (such as the AC servo motor 5a shown in FIG. 5), the main issue is controlling a voltage to drive a motor to rotate. Therefore, in a loop design, a location loop has to correspond to a speed loop to find parameters of a voltage loop. In PID control, merely a ratio control is concerned, and a stable converge cannot be achieved if an error value exists. Therefore, in a speed loop, a micro ratio gain P and an integration gain value I are designed, and are simplified to be an integration time constant Ti. When a voltage is applied, friction compensation is added accordingly. The whole location close-loop control can be achieved via a location encoder or an optical scale of the motor.

In FIG. 5, since the motor and machine architecture and ball screws (the lead screw 50) are stipulated based on the specification of the machine tool 9, and the roundness for goods machining is mainly determined by locations and speed loops, the adjustment of the location loops will affect the response when the location commands are transformed into the speed. The gain value (e.g., the location gain $K_{pp}$) determines the command response, and the speed loop parameters will react with respect to errors.

Figure 6:
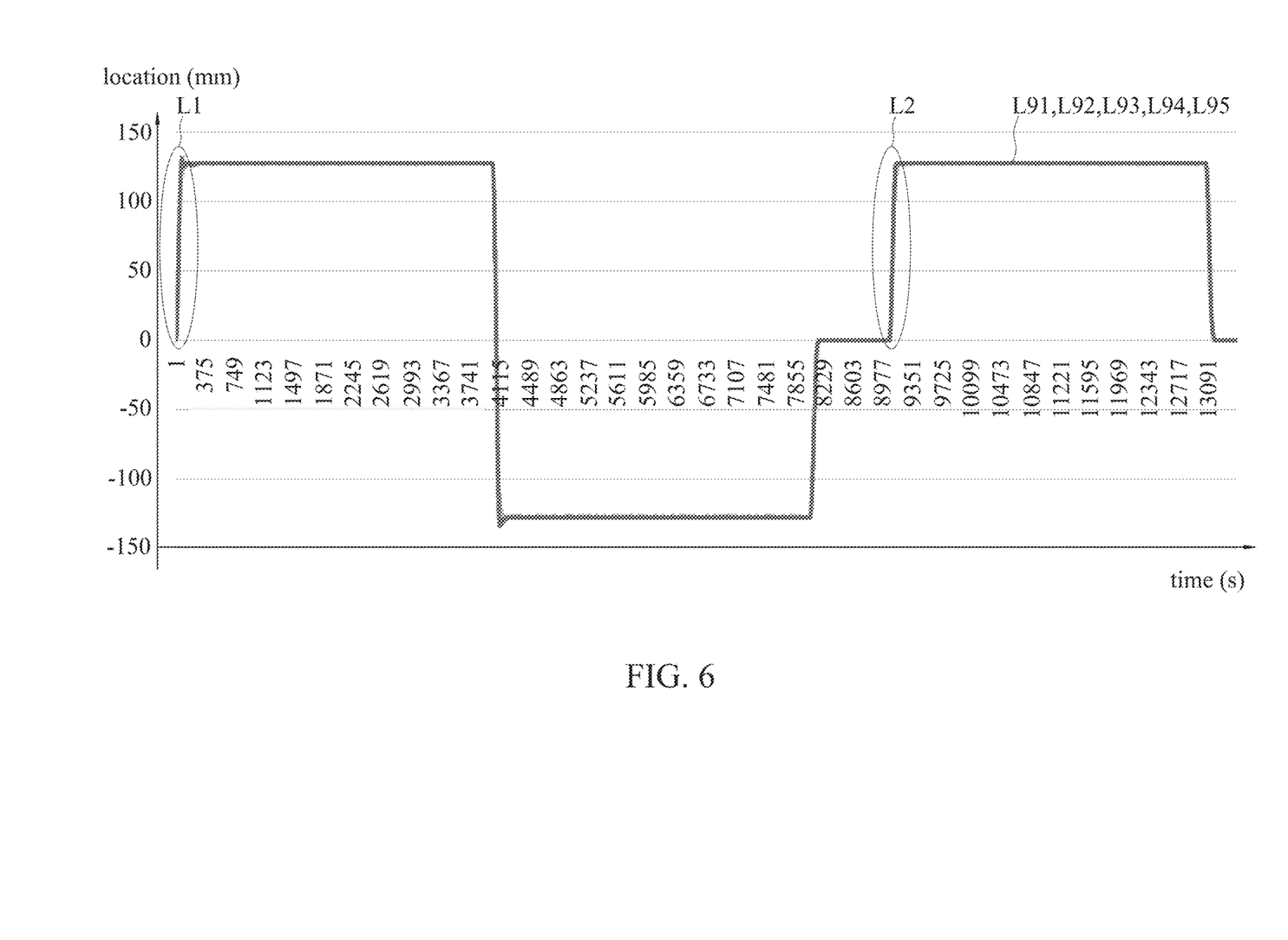
FIG. 6 is a feedback analysis diagram of a machine of a contour accuracy measuring method according to the present disclosure.
Figure 7A:
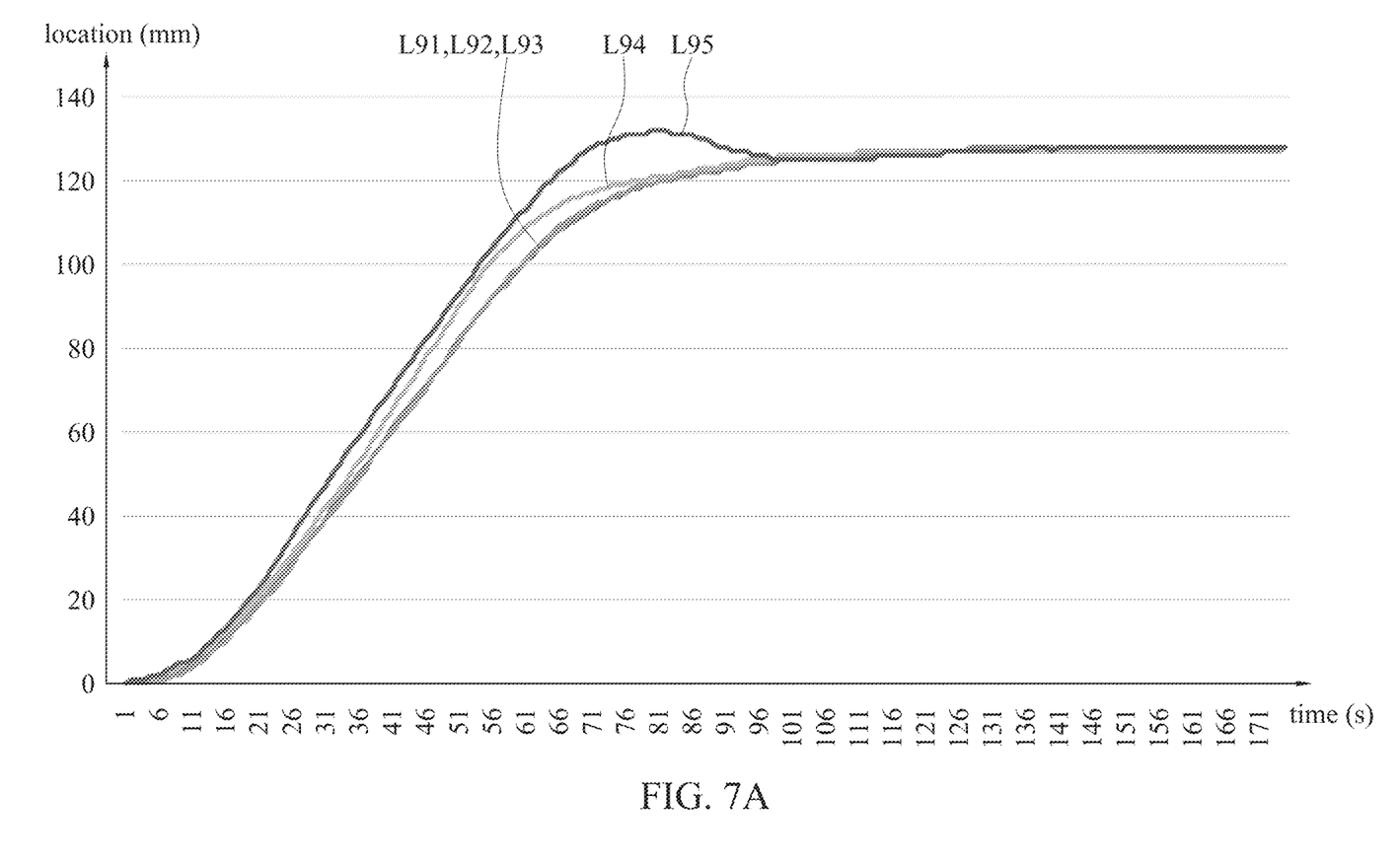
FIGS. 7A and 7B are feedback analysis diagrams of locations of the shafts of a contour accuracy measuring method according to the present disclosure.
Figure 7B:
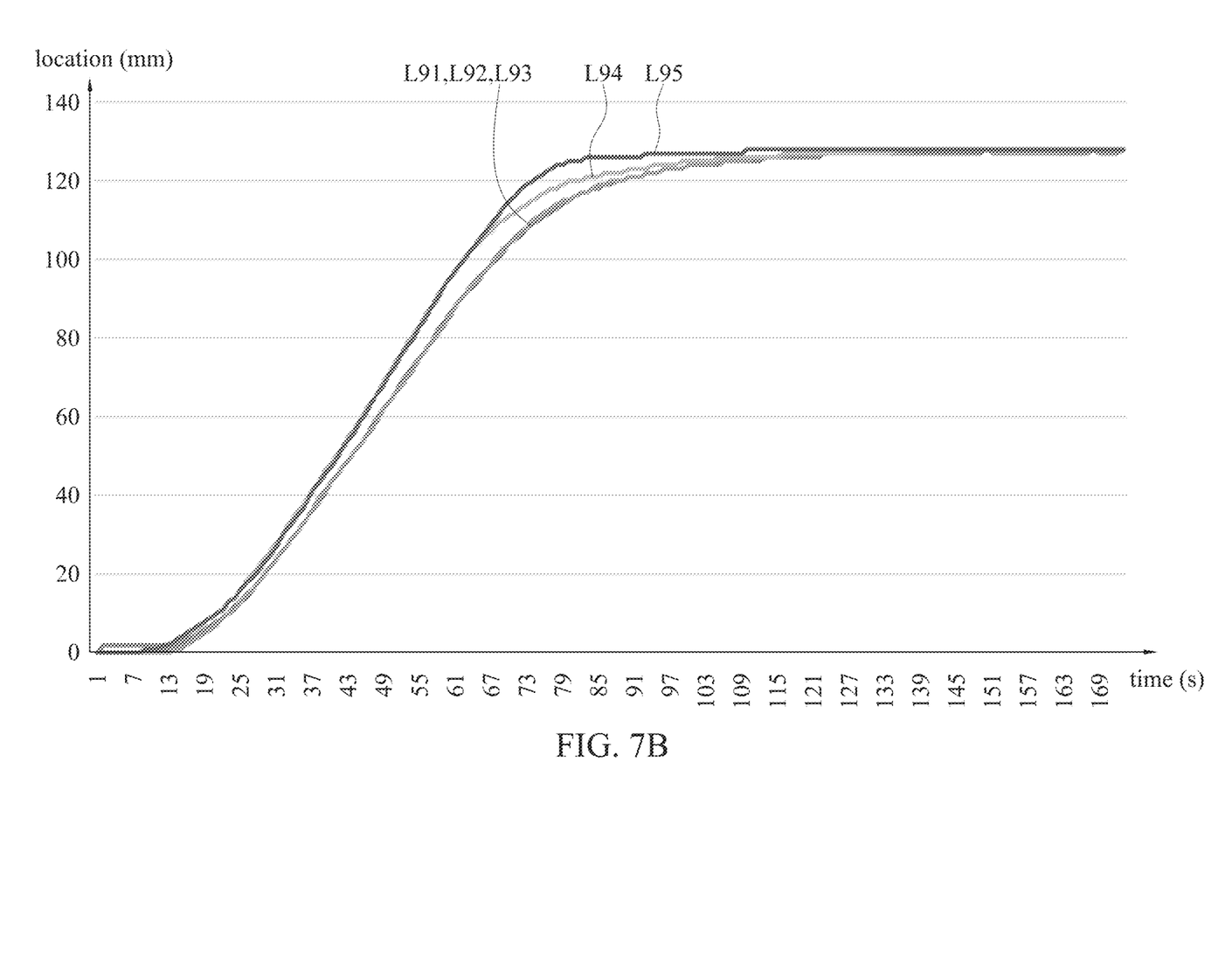

FIG. 6 is a feedback analysis diagram of a machine, where a horizontal axis represents time (s), and a vertical axis represents locations (mm) calculated by an external device capturing signals (encoder coordinate signals or optical scale coordinate signals). With regard to the effect of the original parameters on the roundness and the location loop of the controller 90, if the axis capturing signals on the vertical axis are offset and forked, the synchronously moving locations have obvious errors, and the location gain $K_{pp}$ has to be adjusted, in order to improve the machining synchronously moving match of the machine tool 9.

FIGS. 7A and 7B are location feedback analysis diagrams of five shafts, where a horizontal axis is time (s), and a vertical axis is location values (mm) calculated by an external device capturing signals. The match of roundness location is improved via FIG. 6. For small error of acceleration and deceleration segments (e.g., a knife entering point or direction variations of shafts), the speed gain $K_{vp}$ and the integration time constant $T_i$ have to be adjusted. FIG. 7A shows that the shafts have different variation trends, and the variation ratio increases, which drives the feedback curve to approach the commands. The integration time constant $T_i$ is adjusted again to achieve fast convergence. In the signal diagram of location feedback shown in FIG. 7B, the shafts have similar variation trends, and the roundness is improved.

The roundness and the controller 90 are adjusted based on the following steps.

Step (1): Based on a machine machining result, the controller 90 is measured and determined whether it needs be adjusted. If so, proceed to step (2).

Step (2): The signals of the machining result are analyzed, to determine whether the variations of the five moving shafts (the first to fifth shafts 91-95) in the location diagram have the same trends (e.g., the curves L91-L95 shown in FIG. 6, which correspond to the first to fifth shafts 91-95, respectively). If one of the shafts, when moving, arrives at the final location first, which means that the moving commands for the other shafts are too slow to be synchronous, the $K_{pp}$ parameters of the shafts of the controller 90 are adjusted to be greater, allowing the shafts to match with one another. If, during the adjustment, it is found that the data of an axis on the vertical axis in the location diagram fluctuate abruptly, which means that $K_{pp}$ of this axis is saturated, the $K_{pp}$ of the other shafts are adjusted to be smaller on the basis of the axis, in order for the locations to be matched.

Step (3): After $K_{pp}$ is adjusted, the speed data are analyzed (e.g., as shown in FIGS. 7A and 7B, to which a first area L1 and a second area L2 of FIG. 6 correspond, respectively) and the variations of the shafts are determined whether they comply with the commands in an acceleration segment. In the same speed variation, if the speed variation of one of the shafts does not match with the speed variations of the other shafts, the $K_{vp}$ parameters of the shafts in the controller 90 have to be adjusted, as described in step (2), in which the $K_{vp}$ of the lower shafts in the vertical axis in FIG. 6 is adjusted to be greater. If one of the shafts fluctuates abruptly (e.g., the curve L95 shown in FIG. 7A), its $K_{vp}$ is adjusted to be smaller, allowing the curves of the shafts to be substantially matched (such as the curve L95 shown in FIG. 7B), and Ti is adjusted based on the initial acceleration and the subsequent deceleration. If the shafts change abruptly before and after acceleration segment, Ti is adjusted to be greater; on the contrary, if the shafts change slightly before and after acceleration segment, Ti has to be adjusted to be smaller (compensating), to achieve the match state.

Step (4): The machining process is performed again, to ensure that the adjustment of steps (1) to (3) has been input to the controller 90 successfully.

Therefore, the contour accuracy measuring method performed by the contour accuracy measuring system 1 according to the present disclosure keeps on calculating the maximum and minimum errors of the roundness (i.e. the smaller estimated roundness are better) on the inclined plane E based on a vector algorithm with respect to stimulation of the pin location of the knife 9a, to determine whether the parameters of locations of the first to fifth shafts 91-95 in the machine coordinate system meet the demands, and estimate the effect of the parameters of the servo motor of the machine tool 9 on the synchronously moving contour accuracy of multiple shafts of a machine (e.g., the second true round trajectory S2 on the inclined plane E shown in FIG. 4).

The synchronously moving parameters of multiple shafts of a machine can be adjusted, and the speed gains, speed integration time constants and other parameters can be adjusted based on the established quantification data table.

In the contour accuracy measuring system 1 and the contour accuracy measuring method according to the present disclosure, coordination data captured by the capturing module 10 are transmitted via the transforming module 11 to the processing module 12 to calculate the reference information, and the first to fifth shafts 91-95 of the machine tool 9 are operated via the reference information in real time to get to know whether the locations of the first to fifth shafts 91-95 after the parameters are adjusted meet a standard, so that the cutting accuracy of the knife 9a can be measured in real time. Compared with the prior art, the contour accuracy measuring system 1 (the electronic device 1a) according to the present disclosure allows a user to measure parameters and test operating states automatically and instantly know the parameters (or machining accuracy) that the knife 9a of the machine tool 9 needs to comply with a standard. Therefore, the overall measuring process is fast, the workpiece used for testing is not consumed, and the measurement cost is reduced.

In addition to the above-mentioned five-axis machining tool, the contour accuracy measuring system 1 and the contour accuracy measuring method according to the present disclosure can also be applied to other machine tools.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A contour accuracy measuring method applicable to a machine tool having a controller and multiple shafts, the contour accuracy measuring method comprising:
    capturing, by a capturing module, a feedback signal that the controller uses to instruct the shafts to move along a machining route, and calculating, by the capturing module, locations of the shafts in a machine coordinate system;
    transforming, by a transforming module, the locations of the shafts in the machine coordinate system to locations in a workpiece coordination system;
    calculating, by a processing module, a first true round trajectory of the machining route on an inclined plane presented in the workpiece coordination system as a reference information;
    transforming, by the transforming module, the workpiece coordination system of the reference information into the machine coordinate system and restoring the locations of the shafts in the workpiece coordination system back to the locations in the machine coordinate system; and
    based on the locations of the shafts of the reference information in the machine coordinate system, adjusting, by an adjusting module, parameters of the controller corresponding to the locations of the shafts to generate a target information that includes a second true round trajectory on the inclined plane.

2. The contour accuracy measuring method of claim 1, wherein the first true round trajectory is calculated according to an equation of a circle from three points.

3. The contour accuracy measuring method of claim 1, wherein the first true round trajectory and the second true round trajectory have different contours.

4. The contour accuracy measuring method of claim 3, wherein the first true round trajectory and the second true round trajectory have different roundness.

5. The contour accuracy measuring method of claim 1, wherein the second true round trajectory and the first true round trajectory are calculated according to the same equation.

6. The contour accuracy measuring method of claim 1, wherein the reference information includes an estimated roundness of the first true round trajectory.

7. The contour accuracy measuring method of claim 1, wherein the target information includes an estimated roundness of the second true round trajectory.

* * * * *